Nov. 6, 1928.

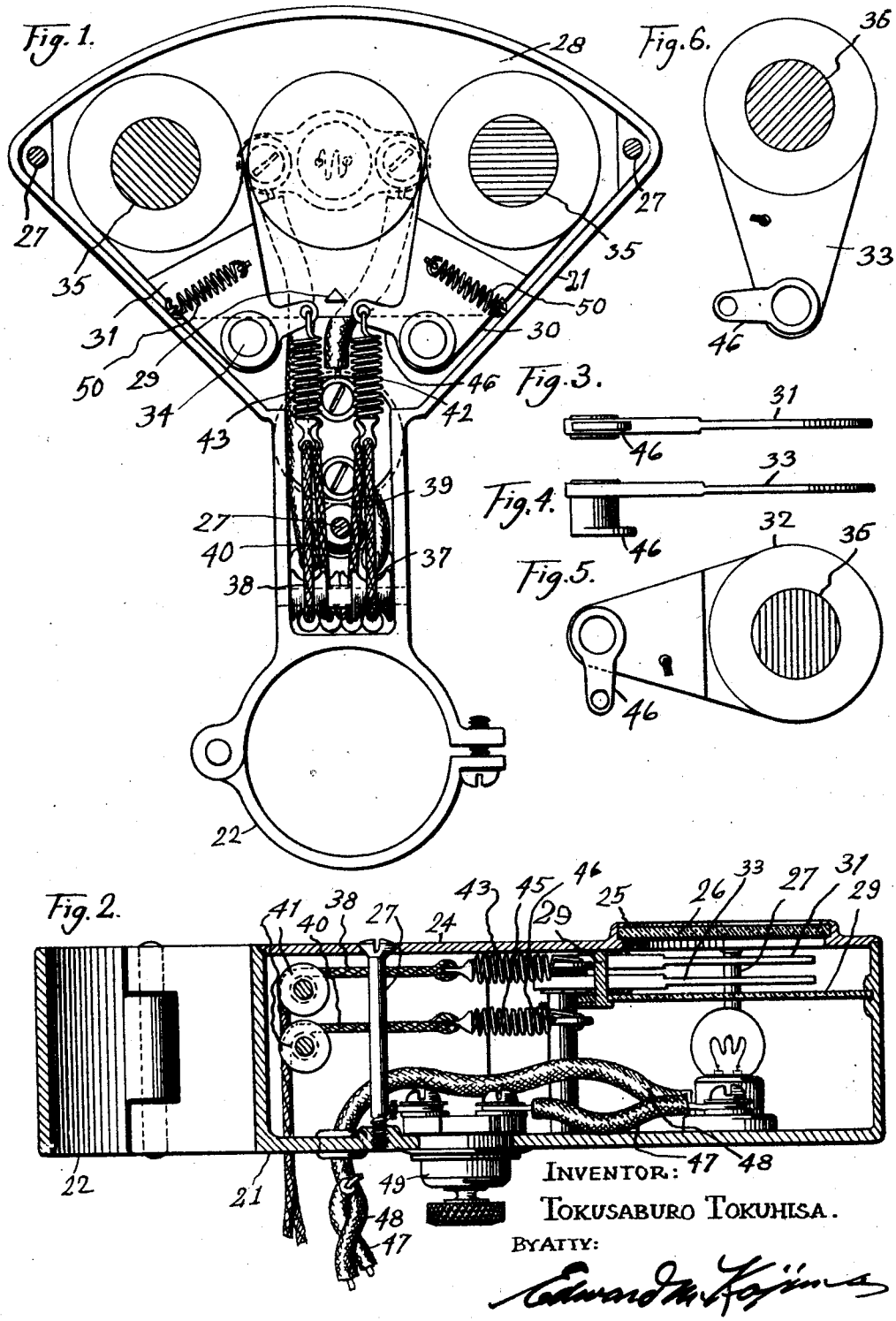

T. TOKUHISA 1,690,956

GEAR SHIFT INDICATOR

Filed Sept. 28, 1927 2 Sheets-Sheet 2

INVENTOR:
TOKUSABURO TOKUHISA.
BY ATTY.

Patented Nov. 6, 1928.

1,690,956

UNITED STATES PATENT OFFICE.

TOKUSABURO TOKUHISA, OF HOLLYWOOD, CALIFORNIA.

GEAR-SHIFT INDICATOR.

Application filed September 28, 1927. Serial No. 222,538.

This invention relates to an indicator device adapted to show the several positions of the transmission gear of an automobile, relative to change of speed and the reverse position.

The object of this invention is to provide indicating means for the gear adapted to be placed in a conspicuous and convenient position relative to the driver's seat, whereby the position of the speed change gears may be determined at a glance.

The drawings illustrate a preferred form of the invention as used in connection with gear of the selective type.

Figure 7:
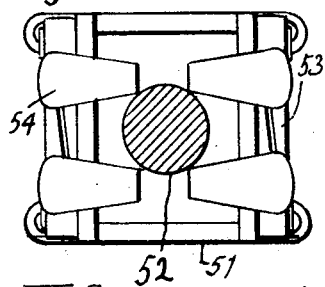
Figure 11:
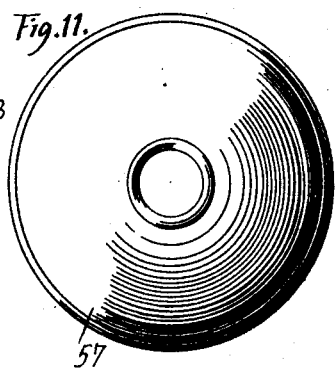
Figure 12:
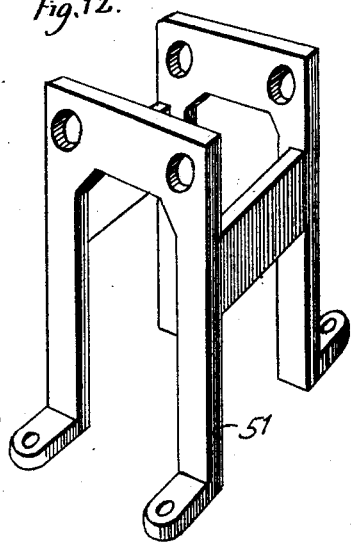
Figure 8:
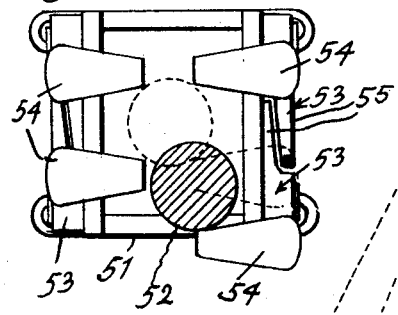
Figure 9:
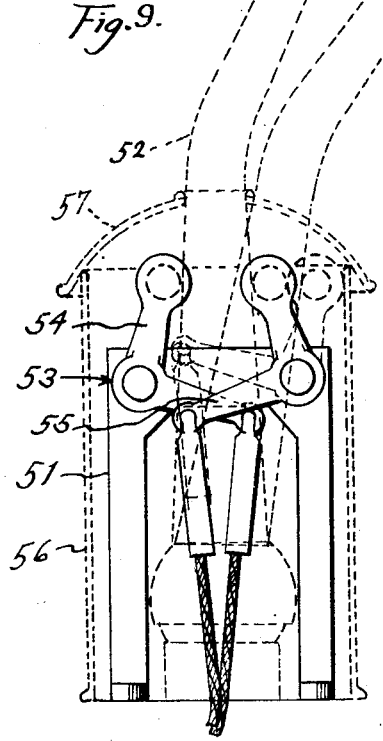
Figure 10:
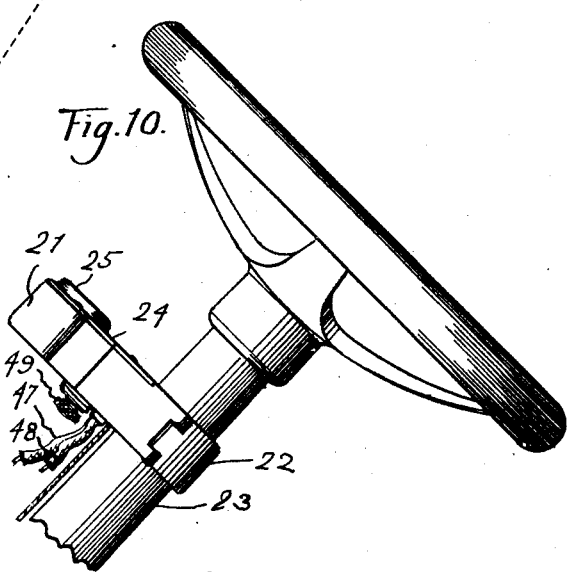

In the drawings, Figure 1 is a plan view of my improved indicator showing the top cover removed. Fig. 2 is a longitudinal and vertical sectional view of the indicator. Fig. 3 is a side elevation of the upper signal member. Fig. 4 is a side elevation of a lower signal member. Fig. 5 is a bottom plan view of a lower signal member. Fig. 6 is a bottom plan view of the opposite lower signal member. Fig. 7 is a top plan view of the actuating mechanism for the signal members. Fig. 8 is a top plan view of the actuating signal mechanism, showing one actuating lever shifted to operative position. Fig. 9 is a side elevation of the actuating mechanism for the signal members, the casing therefor and the gear shift lever being shown in dotted lines. Fig. 10 is a fragmentary view of an automobile steering column, showing my signal device applied thereto. Fig. 11 is a top plan view of the cover for the signal actuating mechanism. Fig. 12 is a perspective view of the frame for the signal actuating mechanism.

Referring to the drawings, the signal device consists of a housing 21, having a clamp portion 22, for securing the housing to a steering column 23. The housing 21 is provided with a cover 24, having the aperture 25, provided with a transparent closure member 26. Draw bolts 27 secure the cover to the housing. The clamp member 22 is hingedly connected to the housing. A light diffusing member 28 is disposed within the housing, and supports a signal arm stop 29. Signal arms 30, 31, 32 and 33, are mounted on supporting shafts 34. The uppermost signal arms 30 and 31, each have a colored glass portion 35, and the lowermost arms have a colored glass portion 36. The uppermost right signal arm is provided with a blue colored portion. The uppermost left signal arm 31, has a green colored portion. The lowermost right signal arm has a red portion. The lowermost left signal arm has a purple colored portion.

To actuate the signal arms to display positions, I provide a cable 37 for the right signal arm 30; a cable 38 for the left upper signal arm 31, a cable 39, for the right lowermost signal arm 32, and a cable 40, for the left lowermost signal arm 33. The actuating cables pass over pulleys 41. The respective cables 37, 38, 39 and 40, are secured, respectively, to springs 42, 43, 44 and 45, which in turn, are secured to short arms 46, on the signal arms. Upon the actuation of any respective cable, a signal arm is operated to a display position beneath the transparent closure member 26 in the cover. The stop 29 limits the movement of any of the signal arms. An electric illuminating bulb 46 is disposed within the housing and in opposition to the display aperture, and is connected to the energizing terminals 47 and 48. A switch 49 is included in one of the terminals. Upon release of any of the signal arms, when in display position, they are actuated to their non-display position, by retracting springs 50, connected to the housing and to members 51 on the signal arms. Springs 42, 43, 44 and 45, are of greater strength than the retracting springs 50, and they allow a certain latitude in the adjustment of the actuating cables to which they are connected.

To secure the movement of the actuating cables for the signal arms, I provide a standard frame member 51 adapted to be mounted adjacent to the gear shift lever 52. On frame 51, I mount the bell-crank levers 53, each having an arm 54 in the path of the gear shift lever when shifted to any of its operative positions, and each bell-crank lever having an arm 55, connected to a cable. The shifting of the gear shift lever to any operative position will therefore actuate a signal arm within the housing, to an operative position beneath the display aperture in the cover. Upon shifting the gear lever to its neutral position, the springs 42, 43, 44 or 45, will actuate a respective bell-crank lever on frame 51, to its neutral position. I provide a housing 56, for the frame member 51, and a cover 57, for the housing 56. Housing 56 is shown in dotted lines in Fig. 9.

In use, the operator will merely shift the gear-shift lever to any operative position as desired, whereupon the signal indicating the position of the gear, will be displayed automatically in the aperture of the signal housing. For night use, the switch 49 may be turned to closed position, thereby energizing the bulb 46, and the respective signals will be illuminated.

The signal arms are shown provided with signal elements of colored glass, each color indicating an operative position of the gear shift lever, but it is to be understood that the signal arms may be provided with letters or other characters which will indicate the desired signals. The signal housing is shown located on the steering column, but may be positioned upon the dash, or other suitable portion of the automobile for displaying the signals. For retaining the bell-crank levers in neutral position when the gear shift lever is actuated to operative position, I provide stop pins 57, on the frame member 51.

What is claimed is:

1. In a signal device, the combination with a housing, and a cover for the housing having a transparent aperture therein, of shafts disposed within the housing, oscillatable signal arms operatively mounted on the shafts and adapted to register with the aperture, and normally in an inoperative position relative to the aperture, a stop element to limit the movement of the signal arms when actuated to operative position, springs arranged to retract the signal arms to inoperative position, and means for actuating the signal arms to operative position.

2. In a signal device, the combination with a housing and a cover therefor having a display aperture, of shafts disposed within the housing, oscillatable signal arms mounted on the shafts and each having a distinctive color, each signal arm lying normally in an inoperative position relative to the aperture, means for actuating the signal arms selectively to operative position beneath the signal aperture, means for retracting the signal arms to their inoperative position, and a stop element within the housing, limiting the movement of all signal arms when in operative position.

3. In a signal device, the combination with a housing and a cover for the housing having a display aperture, of shafts mounted within the housing and one on either side of the aperture, signal arms mounted on said shafts, and normally lying in inoperative position, and means for actuating the signal arm selectively to their operative position beneath the aperture, a stop limiting the movement of the signal arms when in display position, and retracting means operative when the arms are released.

4. In a signal device for a gear shift lever, signal arms each having a color characteristic, a housing for the signal arms having a display aperture, means in connection with the gear shift lever for actuating the signal arms selectively to operative position beneath the aperture, a stop element limiting the movement of the signal arms when in display position, resilient elements interposed in the actuating means, and resilient retracting elements for the signal arms operative when the actuating means are in neutral position.

5. In a signal device for a gear shift lever, signal arms each having a different color characteristic, a housing for the signal arms, a cover for the housing having a display aperture intermediate the signal arms, said signal arms being normally in non-display position, elements connecting the gear shift lever and signal arms and arranged to move the arms selectively to operative position on actuation of the gear shift lever, resilient elements interposed in the connecting elements, a stop element limiting the movement of all signal arms in display position, and retracting means for the signal arms when the actuating elements are in neutral position.

6. In a signal device, a standard adapted to be arranged adjacent to a gear shift lever, bell-crank levers mounted on the standard and adapted to be actuated by the lever when shifted to any of its operative positions, signal devices apart from the standard, and connecting elements between the signal devices and the bell-crank levers whereby the signal devices are operated selectively to a display position upon actuation of the gear shift lever.

7. In a signal device, signal arms each having a different color characteristic, a housing for the signal arms, a cover for the housing having a display aperture, shafts for the signal arms mounted in the housing, a stop member within the housing and between the supporting shafts, cables for actuating the signal arms from non-display position to a display position beneath the aperture, a spring with each cable, levers for actuating said cables and arranged to be actuated selectively by the movement of the gear shift lever of an automobile, other springs arranged to retract the arms to non-display position when the gear shift lever is moved to neutral position, and a cover for the actuating means.

In testimony whereof, I hereunto affix my signature.

TOKUSABURO TOKUHISA.